March 18, 1941.  M. DUCKSTEIN  2,235,422
LUBRICATING DEVICE FOR AIRCRAFT ENGINES
Filed June 14, 1939
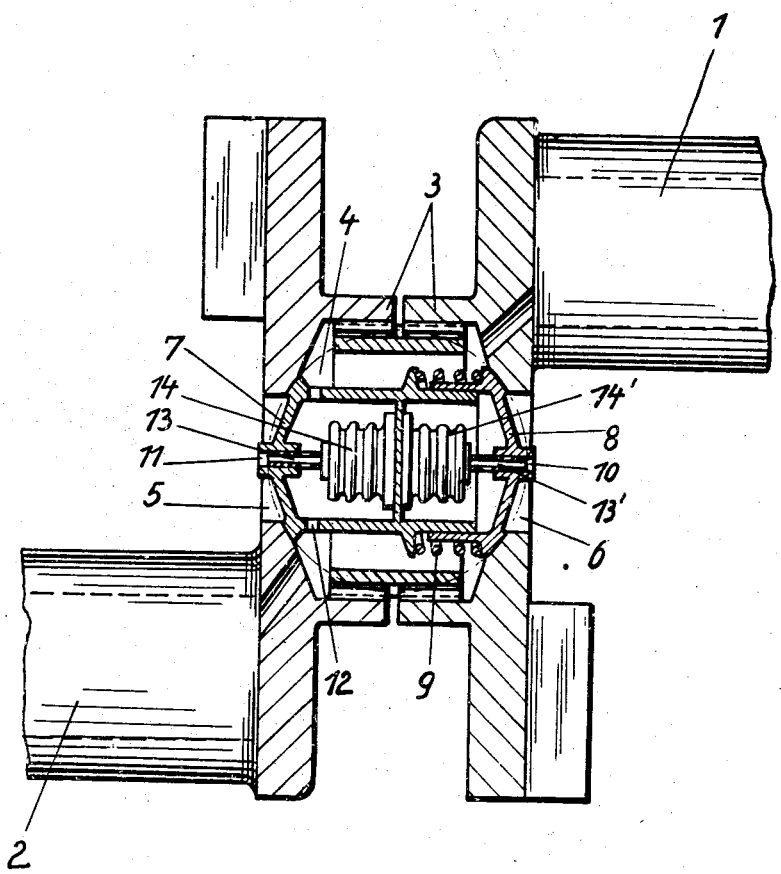
INVENTOR:
MARTIN DUCKSTEIN
by
ATTORNEYS Patented Mar. 18, 1941

2,235,422

UNITED STATES PATENT OFFICE 2,235,422

LUBRICATING DEVICE FOR AIRCRAFT ENGINES

Martin Duckstein, Obermenzing, Munich, Germany, assignor to Bayerische Motoren Werke Aktiengesellschaft, Munich, Germany, a company of Germany Application June 14, 1939, Serial No. 278,999
In Germany June 16, 1938

6 Claims. (Cl. 184—6)

The subject of the present invention relates to lubricating devices for aircraft engines wherein a nozzle is located in the hollow pivot of the crank shaft, by which lubricating oil is sprayed directly on the driving mechanism. The quantity of oil which is distributed is thus effected automatically dependently on the temperature of the oil and is controlled by a thermostat connected coaxially with a regulating valve, the thermostat and regulating valve being both located in the hollow crank shaft. Such devices are generally disclosed in my copending application Serial No. 272,123, filed May 6, 1939, of which the instant application is a continuation in part.

The device according to the present invention is adapted to enable the lubricating device to be used also in connection with double-bank radial engines in which the crank shaft is divided at the central bearing pivot, and of which the two parts are positively coupled for rotation but in spite of this permit of deviations from the common longitudinal axis of the crank shaft. In the case of double-bank radial engines two overlapping casings closed at their outer ends are located, according to the invention, in the hollow central bearing pivot, which spray the oil in opposite directions on the two crank-shaft off-sets.

With reference to the accompanying drawing, which shows in section, the device according to the invention in the central bearing pivot of a double-bank radial engine crank shaft, the construction and arrangement thereof will be described hereinafter.

The two halves 1 and 2 of the crank shaft form together the central bearing pin 3 in the hollow interior 4 of which there is mounted the lubricating device. The interior 4 of the bearing pivot 3 communicates with the general lubricating oil circulation by means of bores, so that the prevailing operating oil pressure is obtained in the chamber 4. Into the chamber 4 there is fitted the device according to the invention, which serves for the reception of the thermostats 14, 14', which regulate the injected quantity of oil, and the injection nozzles. This device consists of two casings 7 and 8 which are closed at their outer ends and overlap one another for a predetermined length. The two casings are relatively forced apart by a spring 9 and are thus forced with their spherically formed outer surfaces against the correspondingly constructed inner edges of the bores 5 and 6 provided in the crank cheeks. The chamber enclosed by the casings communicates with the internal chamber 4 of the crank shaft pivot through bores 12 in the periphery of the casings, so that the chamber enclosed by the casings is also filled with oil at the prevailing operating pressure. The casings 5 and 6 are closed at their end faces bearing against the crank cheeks and are each provided at the centre of the end face with a small bore 10, 11, through which the oil to be sprayed on the driving mechanism passes out towards both sides, these bores serving for the mounting of the regulating valves and simultaneously for controlling the quantity of oil which is to be ejected at each end. The regulating valves 13, 13' are mounted at the free ends of the thermostats 14, 14' and are moved by these.

The annular bearing surfaces of the casings 7 and 8 adjacent the crank cheeks, bear, according to the invention, against a spherical surface of which the centre is located at the point of intersection of the vertical central axis and the longitudinal central axis through the central bearing pivot.

By this arrangement it is rendered possible, in connection with double-bank crank shafts divided at the middle, in which the connection permits of deviations of the two crank shaft throws relatively to the longitudinal axis, to so mount the lubricating devices, located in the interior of the central bearing pivot each of which consists in the known manner of a regulating valve connected coaxially to a thermostat and which spray oil from the crank shaft on to the driving mechanism, that no movements are transmitted to the lubricating devices. In this connection an essential point is that there is thus effectively prevented a wedging of the regulating valve in its guide, as also relative movements between the regulating valve and its associated thermostat, and consequently defective regulations are excluded. At the same time the internal chamber 4 is rendered fluidtight against undesirable leakage of oil at the surface at which the casings 7 and 8 bear against the crank cheeks by reason of the spherical construction of these surfaces, in accordance with the invention, and the pressure which is applied by means of the spring located between the casings.

Having described an illustrative embodiment of the invention, it is pointed out that various changes and modifications therein may be made without departing from the invention as set forth in the claims which follow.

I claim:

1. In a double-bank radial engine, in which each bank has a crank shaft co-axially mounted relatively to the crank shaft of the other bank hollow juxtaposed shaft extensions forming a central bearing pin, and means for supplying lubricating oil to the interior of said pin, the combination of nozzles for spraying oil from both ends of said pin into the driving mechanism of each engine, and means responsive to the temperature of said oil for regulating said nozzles.

2. The combination according to claim 1, in combination with a housing inserted within the bearing pin for supporting said nozzles and temperature responsive means, said housing having an opening for communication with said lubricant supplying means.

3. The combination according to claim 1, in which the hollow bearing pin is formed with axial openings at either end having substantially spherical inner edges, and a two-part housing member supporting said nozzles and temperature responsive means and formed with outer spherical end surfaces, and spring means for holding the end of each housing part against the spherically shaped inner edges of the axial openings in said bearing pin.

4. In combination, a pair of substantially co-axially mounted crank shafts having hollow juxtaposed extensions forming a bearing pin, and having axial openings at each end of said pin, means for interconnecting said shaft extensions for drivably interconnecting said crank shaft while simultaneously permitting relative deviations from the common axis, a two-part relatively slidable casing having a bore at either end, and one or more radial bores, spring means for mounting said casing within said bearing pin and pressing each part thereof against the end of said pin in such a manner that the bores in the ends of said casing are normally substantially co-axial with the axial openings in said bearing pin, adjustable valve means mounted in each end bore of said casing, and temperature responsive means for adjusting each valve, mounted within said casing.

5. The combination according to claim 4, in which the inner edges of the axial opening in said bearing are formed as a spherical surface whose center is located at the point of intersection of the vertical central and longitudinal central axes of said pin, and the outer ends of said casing resting against said surfaces are similarly formed, whereby deviation of either of said crank shafts from the common axis does not result in movement of said casing.

6. A crank shaft having a hollow bearing pivot, means for supplying lubricating oil to the interior of said pivot, nozzles for spraying oil from both ends of said pivot, and means responsive to the temperature of said oil for regulating said nozzles.

MARTIN DUCKSTEIN.